United States Patent [19]

Bowman

[11] 4,014,113
[45] Mar. 29, 1977

[54] COMPUTATION WORD BUILDER

[76] Inventor: William T. Bowman, 2816 29th Ave. S., Minneapolis, Minn. 55406

[22] Filed: Jan. 12, 1976

[21] Appl. No.: 648,113

[52] U.S. Cl. .................................... 35/74; 35/9 R
[51] Int. Cl.² ......................................... G09B 3/04
[58] Field of Search .............. 35/23 R, 31 A, 31 C, 35/74, 9 R

[56] References Cited

UNITED STATES PATENTS

| | | | |
|---|---|---|---|
| 1,256,997 | 2/1918 | Gifford | 35/74 |
| 1,346,929 | 7/1920 | Zion | 35/74 |
| 2,965,978 | 12/1960 | Olson | 35/23 R |

Primary Examiner—Harland S. Skogquist
Attorney, Agent, or Firm—Robert C. Baker

[57] ABSTRACT

Apparatus for improving the skills of mathematical computation and alphabet usage, comprising a computation selector in combination with an answer verifier. The computation selector comprises a problem board member and a selector member mounted for relative rotation with respect to each other. Computational problems are carried on the problem board member with the correct answer to each problem represented by a code marking or letter code on the problem board. Selection of a specific problem is governed by chance, being the result of rotation of the selector member in relation to the problem board. The answer verifier comprises an answer board member and a visibly distinct identifier member mounted for indexing movement with respect to each other. Letter codes from the problem board are arranged on the answer board member in uniform association with the numerical value of the correct answer represented by them. The correct answer numerical value is visually apparent and identified by the identifier member when the identifier member is indexed to visually mark the letter code for the problem from the problem board. Letters earned during play are available for use in forming words.

15 Claims, 5 Drawing Figures

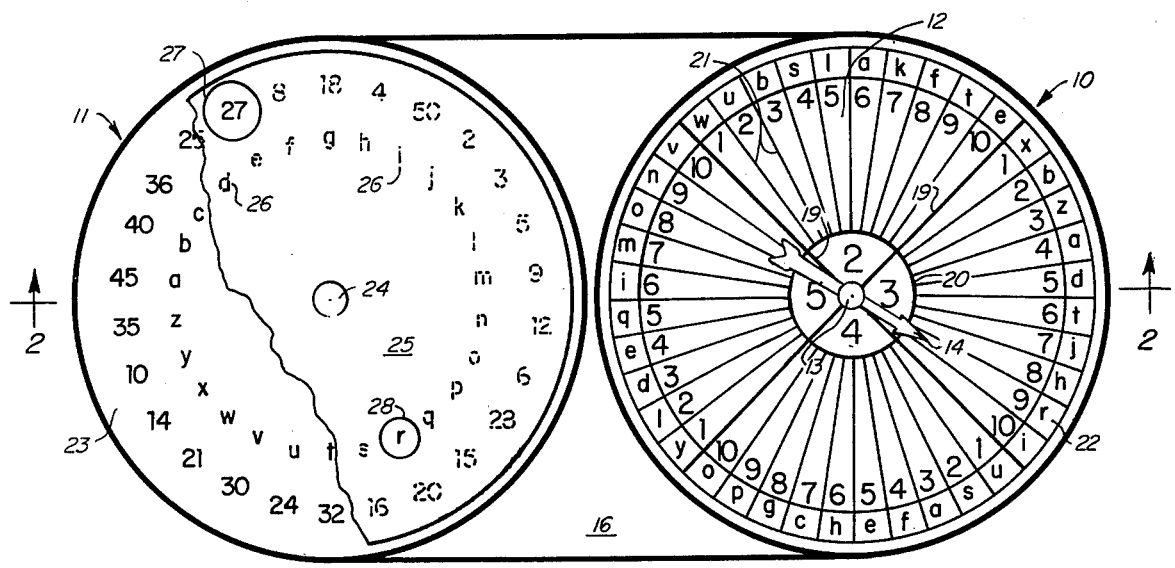
FIG. 1
FIG. 2
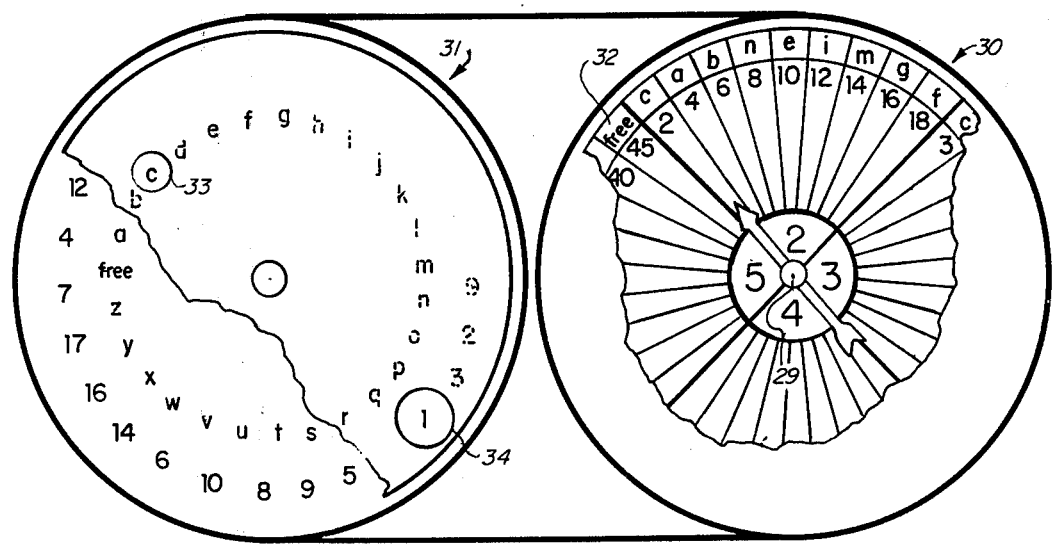
FIG. 3
FIG. 4
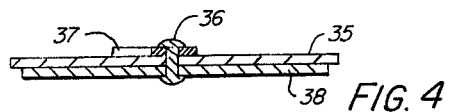
FIG. 5

COMPUTATION WORD BUILDER

This invention relates to apparatus for improving the basic skills of mathematical computation and alphabet usage.

These basic skills constitute the foundation for almost all advanced learning. Thus it is that the early steps to be taken by a youngster into the area of learning to manipulate the symbols for both mathematics and language are vitally important from an attitudinal standpoint, especially in terms of creating an enjoyment for the learning by the youngster. An early negative attitude that any part of learning is dull work or frustrating can cause a youngster to reject learning, and it too often difficult to replace later with an attitude of enjoyment. Consistent with Plato's admonition that learning for the child should take the form of play, this invention provides apparatus whereby the rote character of basic mathematical computation and alphabet usage can become an entertaining and enjoyable game of play.

Many different approaches have been taken in an effort to provide apparatus for improving the attitudinal problem; but insofar as is known, no approach heretofore taken deals with the interrelationships and arrangement of elements characteristic of this invention. The closest known prior art is set forth in the following U.S. Pat. Nos.: McArthur 470,765; Dorer 1,210,614; Devlin 1,211,103; Hoeft 1,548,601; Brittingham 1,619,849; Wright 1,728,584; Stover 2,681,804; Bredehorn 3,096,092; Benson 3,289,324; Krause 3,606,336; Felton 3,624,928; Fyanes 3,704,018; Nelson 3,827,161; and Malisow 3,889,954.

The apparatus of this invention comprises a computation selector in combination with an answer verifier.

The computation selector comprises a problem board member and a selector member. The problem board member has a central point. Means unite the computation selector members together for relative rotary movement of one with respect to the other about the central point of the problem board member. The problem board member carries on it visible indicia arranged in circumscribing fashion about its central point. The indicia includes an inner array of primary numbers and an outer array of secondary numbers. The inner array comprises at least two of the primary numbers. Each such primary number is separated from adjacent ones thereof by a primary radial line separator, whereby each such primary number lies within a radial primary segment about the central point of the problem board. The outer array of secondary numbers is radially outward from the primary numbers and is arranged with at least three of the secondary numbers within the arc ambit of each aforenoted radial primary segment. Each secondary number lies within a radial secondary segment defined by secondary radial line separators between the secondary numbers. Substantially all of the secondary numbers have associated therewith a visible letter code. Each letter code is representative of the numerical value of the correct answer for a predetermined mathematical computation between the secondary number with which the letter code is associated and the primary number within the arc ambit of whose radial primary segment the secondary number is located. Different correct answer numerical values are represented by different letter codes.

The answer verifier comprises an answer board member and a visibly distinct identifier member. Means unite the answer verifier members together for relative indexing movement of one with respect to the other. The answer board member carries on it indicia comprising each letter code appearing on the computation selector. Each letter code on the answer board member has in uniform association with it the numerical value of the correct answer for the aforesaid predetermined mathematical computation. The correct answer numerical value associated with each letter code on the answer board is visually apparent and identified by the identifier member when the identifier member is indexed to visually mark the letter code with which the correct answer numerical value is associated.

Preferably, the letter codes on the answer board are arranged in a circumscribing array about a central point for the answer board; and the indexing movement between the answer verifier members is preferably rotary.

The computation selector and answer verifier preferably are united together as a single piece of equipment. Normally, the indicia or markings on any one set of apparatus should be devoted to one form of computation, such as multiplication, division, addition, or subtraction. While letter codes of two or three letters may be used, it is usually preferable to employ single letters selected from the alphabet. Also, letter codes on the problem board are preferably arranged in random fashion (i.e., non-alphabetically), but are arranged in orderly fashion (i.e., in the sequence in which they appear in the alphabet) on the answer board. Vowel letter codes are desirably employed whenever three or more answer numerical values to be represented are of identical or equal value. Discrete playing pieces, each having a single letter of the alphabet thereon, are optionally but preferably included as part of the apparatus, and are useful for practice in the formation of words. Rules of play may vary and permit versatile usage of the apparatus of the challenge and enjoyment of the learner.

The invention will further be described by reference to a drawing, made a part hereof, wherein:

FIG. 1 is a schematic top plan view of a playing board, with a disk identifier member partially broken away and with elements masked by the remaining portion of the disk shown in phantom or broken lines;

FIG. 2 is a schematic cross section taken on line 2—2 of FIG. 1;

FIG. 3 is a schematic top plan view of an alternate playing board, with parts broken away or omitted and some masked elements shown in phantom;

FIG. 4 is a schematic cross-sectional view of an alternate form of apparatus; and FIG. 5 is a schematic view of a few illustrative alphabet letter playing pieces.

Referring to FIGS. 1 and 2, the playing board or apparatus comprises a computation selector 10 shown at the right in FIG. 1, and an answer verifier 11 shown on the left in FIG. 1. The specific computation selector and answer verifier illustrated in FIG. 1 are designed for use in practicing multiplication.

The computation or multiplication selector 10 comprises a problem board member or disk 12 having a central point 13, plus a selector member 14 which suitably may take the form of an arrow. The selector member or arrow 14 preferably is located in a different plane from the board member. Means 15, such as a rivet or other fastening device, unite the multiplication selector members (that is, the board 12 and arrow 14) together for relative rotary movement of one with respect to the other about the central point or axis 13 of the problem board member. Where the arrow 14 is mounted for spinning, the problem board member may be integral and sealed to a base member, or unitary with the base 16 as a single layer. But where the problem board member 12 is to be rotated or spun (with the arrow or selector member 14 fixed in position relative to the base member 16), then it is usually desirable to employ a disk-like problem board and to mount it between washers or bearing members 17 and 18 about the central point 13 or rivet shaft 15.

The problem board member 12 carries on it several items of visible indicia or markings arranged in a circumferential pattern or in a circumscribing fashion about the central point or axis 13 of the problem board. This indicia includes an inner array of primary numbers or "first" array of numbers (illustrated in FIG. 1 by the multipliers 2, 3, 4 and 5 about the axis 13 in that Figure). The indicia also includes an outer array of secondary or "second" array of numbers (illustrated by four groupings of the multiplicands 1 through 10, inclusive, in FIG. 1).

The inner array always comprises at least two primary numbers. More may be employed, but the total generally will not exceed eight (e.g., numbers 2 through 9, inclusive, may be placed in an inner array). Each numeral of the inner array is separated from adjacent ones of that array by a primary radial line separator 19. Thus, each numeral in the inner array lies within a radial primary segment (defined by separator lines 19) about the central point 13 of the problem board member. Where only two numerals are employed for the inner array, the radial angle for the radial primary segment of each may be 180°. But normally more than two numerals will be present in the inner array; and the radial primary segments will usually take the form of pie shapes having radial angles less than 180°. To separate the inner array of numerals from the outer array, it is preferable to employ an intermediate circular barrier line 20, or other mark causing visual separation of the inner and outer array of numbers.

The outer array of numerals is spaced radially outwardly from the inner array and is arranged so that each numeral of the outer array lies within a radial secondary segment outwardly from the central point 13. The radial secondary segments are in every instance smaller than the radial primary segment within the arc ambit of which any radial secondary segment is located. Each radial secondary segment is defined by secondary radial line separators. For example, the radial secondary segment for the secondary number 2 (as located within the arc ambit of the primary radial segment for the inner primary number 2 in FIG. 1) is defined by secondary radial line separators 21. For practical purposes, it is best to employ at least three secondary numbers or segments within the arc ambit of each radial primary segment. But, as illustrated in FIG. 1, each radial primary segment (for inner array of numbers) encompasses ten radial secondary segments (for the outer array of numbers). Even more secondary segments may be encompassed within the arc ambit of a primary segment, if desired. However, for ease of visual clarification, it is best to employ no more secondary segments than ten for each primary segment.

Substantially all of the secondary numbers of the outer array has a visible letter code 22 associated with it. Indeed, in FIG. 1, all do; but "free" marks or other code markings may sometimes be desirably employed as a replacement for a code letter or letters. The code letter or letters are normally selected from the alphabet of popular use in the social group or country where the apparatus is employed. Each letter code represents a product value, but in code form. Thus, each letter code constitutes a coding of the numerical value of the correct answer for a predetermined mathematical computation between the secondary number with which the letter code is associated (e.g., the secondary number 9 for code letter $r$ in FIG. 1) and the primary number within the arc ambit of whose radial primary segment the noted secondary number is located (e.g., the primary number 3 in FIG. 1). Since FIG. 1 is designed for multiplication practice, and since the correct answer is 27 for 3 times 9, it is obvious at this point that the letter code $r$ must represent a correct answer numerical value of 27.

It should be emphasized at this point that different letter codes are used for different correct answer numerical values; but the same letter code may be employed repeatedly for identical or equal correct answer numerical values. Further, the letter code preferably comprises a vowel whenever three or more problems on the problem board give the same correct answer numerical value. In FIG. 1, it should be noted that the vowels $a$ and $e$ are employed three times, whereas the vowels $i$, $o$ and $u$ are employed twice. Additionally, each consonant is employed at least once on the problem board member of FIG. 1; and the consonants $b$, $d$, $f$, $h$, $l$, $s$ and $t$ are employed twice. The preferred selection of code letters which are used on the problem board more than once is governed by the estimated likelihood of them appearing frequently in words apt to be formed by youngsters using the apparatus of the invention.

Before proceeding to describe the answer verifier portion 11 of the playing board, it should be noted that the initial step of play is that of spinning the selector member or arrow 14 (or relatively rotating the problem board member 12 with respect to the arrow). The point of the arrow defines the problem selected by or for the child. The problem illustrated on the computation selector 10 of FIG. 1 is that of multiplying 3 times 9, coded by $r$. Since the computation selector of FIG. 1 is designed for practice in multiplication, the primary numbers of the inner array on the problem board 12 are suitably looked upon as multipliers, and the secondary numbers of the outer array are suitably looked upon as multiplicands.

The answer verifier portion of the playing board comprises an answer board member 23 having a central point 24, and a visibly distinct identifier member 25 shown in FIG. 1 as taking the shape of a disk. The disk identifier member 25 is preferably located in a different plane from the answer board member 23. Means such as a rivet or other fastener is employed to unite the answer board member 23 to the identifier member 25 so as to permit relative rotary indexing of one with respect to the other about the central point 24 of the answer board member. Where the identifier member is mounted for relative rotary indexing, the answer board member 23 itself may be unitary with a base board or sheet structure 16 (e.g., the board portion of the answer board 23 and the base 16 may be one and the same). However, where the identifier member or disk 25 is fixed in position, then the answer board member 23 is mounted for rotary indexing about its central point. As illustrated, it is the disk identifier member 25 which is mounted for relative rotary indexing.

The answer board member 23 FIG. 1 carries on it the indicia of each of the letter codes employed on the computation selector problem board 12 of the apparatus of FIG. 1. The letter codes 26 on the answer board member are arranged in a circumferential fashion or a circumscribing array about the central point 24 of the answer board member. Preferably, single letter codes on the answer board are also arranged in the sequence in which they are recited when reciting the alphabet (that is, for the English alphabet, from *a* to *z* ). They preferably are spaced from the central point 24 at approximately equal distances and spaced from each other so that only one code letter lies in any one imaginery radial segment of the answer board.

Further, each letter code 26 on the answer board member 23 has, in uniform or regular association with it, the numerical value of the correct answer represented by that identical letter code as it appears on the problem board member 12 of the apparatus of FIG. 1. Thus, the code letter *r*, representing a product value of 27 (for the multiplication selector 10 of FIG. 1) is associated on the answer board member with the correct answer numerical value of 27. The correct answer numerical value represented by each letter code is suitably diametrically opposed to its respective letter code and spaced outwardly from the circle of letter codes.

The identifier member 25 of the answer verifier is preferably an opaque disk having two windows 27 and 28 in it. The window 27 which is most radially outward is the window identifying the correct answer value. The window 28, slightly radially inward from the answer value window 27, is the window through which individual letter codes 26 on the answer board member 23 are viewed. Thus, where the correct answer numerical value for the code letter *r* is sought, the disk identifier member 25 is rotatably indexed so that the letter code window 28 permits viewing of the *r* on the answer board member 23. By glancing across the disk 25, the answer itself is viewed through window 27. Thus, the correct answer or product value represented by the code letter *r* is noted through window 27 to be 27.

Thus it is that the correct answer numerical value, as associated with a particular letter code on the answer board, becomes visibly apparent and identified by the disk identifier member 25 when the identifier member is indexed to visually mark the letter code with which the correct answer numerical value is associated.

It should be emphasized, however, that the circumferential array of answer letter codes 26, as well as the correct answer numerical values, may vary. For example, answer values might be carried on the answer board so as to occupy a space directly radially outward from their respective letter codes representative of the value. Where such is done, the answer window 27 will be shifted adjacent to the letter code window 28 on the disk identifying member. Alternately, the array of answer values on the answer board member might be shifted 90° to the arrangement illustrated in FIG. 1. In such cases, the answer window would be shifted 90° to that illustrated, so that the answer value would appear in the answer window whenever the letter code window is placed over the letter code on the answer board member. Preferably, however, diametrical positioning of answer values from letter codes on the answer board is employed so that the youngsters using the equipment are confronted first with visual impressions of letter codes (as they index the identifying member 25 in search of the needed letter code), and then must look to a different location to verify whether they earlier gave the correct answer value for the problem selected on the computation selector 10.

While an opaque disk form for the identifier member is most preferred (with windows for viewing the answer values and the letter codes, as illustrated), a transparent identifier member may be employed with arrows or other markers or a border used for identifying a specific letter code as well as its correct answer numerical value.

The playing apparatus illustrated in FIG. 3 is in all respects comparable to that illustrated in FIGS. 1 and 2, except that the apparatus of FIG. 3 is especially designed for practice in division. Thus, the primary numbers of the inner array (i.e., numbers 2, 3, 4, and 5 near center 29) are suitably looked upon as divisors, and the secondary numbers of the outer array are suitably looked upon as dividends. Further, the letter codes on the problem board of the computation selector 30 of FIG. 3 are representative of quotients (that is, the correct answer numerical values for the problems of division contained on the problem board). These letter codes on the problem board are also arranged, in comparable manner to that illustrated in FIG. 1, on the answer board member of the answer verifier 31. On the answer board, they are in association with the correct answer numerical values which they represent.

Another distinguishing feature for the apparatus illustrated in FIG. 3 is that of one "free" mark 32, replacing the normal letter code on the problem board. The problem with which "free" is associated is noted to be that of dividing 5 into 45; thus the correct answer coded by "free" is 9. When the code window 33 of the answer identifier member is placed over "free" on the answer board, the correct answer value 9 is shown in the answer window 34 of the identifier member. But the youngster spinning the arrow of the computation (i.e., division) selector 30, and finding his problem to be that of dividing the dividend 45 by the divisor 5, is allowed to choose any letter from the alphabet. Ordinarily, he would be limited, at each turn for his play, to the letter code representing the correct answer numerical value for the problem selected by or for him on the problem board.

When apparatus of the invention is designed for practice of addition of numbers, the same arrangements as aforenoted may be employed (e.g., see FIG. 1) for the numerical indicia on the computation selector portion of the apparatus. Even the letter codes on the computation selector of FIG. 1 may remain substantially unchanged; but a few letter codes will of necessity be altered. For example, note that *t* in FIG. 1 represents the correct product value of 18 for multiplication; and *t* occurs at two locations in FIG. 1. In the case of addition, *t* might be used to represent the correct answer value of 11 (e.g., 2 plus 9 equals 11). Under such circumstances, the *t* in the radial primary segment occupied by the 3 of the inner array will be changed to a different code letter, because 3 plus 6 equals 9 in that radial primary segment. Of course, for addition purposes *t* could be used to represent a correct answer value of 11 in each of the radial primary segments where a letter code is needed to represent a correct addition product value of 11. Further, in the case of addition practice, the answer verifier portion of FIG. 1 would be altered so that the correct addition answer numerical values would be visible through the window 27 for each letter code on the answer verifier. For example, the window 27 would reflect a correct addition answer value of 12 for the code letter r (assuming r remained at its location as shown in FIG. 1) when the apparatus is altered for addition use. If desired, the same correct answer numerical value, for two or more problems on any apparatus of the invention, may be represented by different letter codes (including combinations of letters).

In a similar manner, the apparatus of FIG. 1 may be modified to form a playing board for use in practicing subtraction, either with the inner array of primary numbers subtracted from the outer array, or vice versa. Again, letter codes will be adjusted, comparably as aforenoted, to reflect and code correct subtraction answer numerical values.

The showing in FIG. 4 is for the purpose of illustrating an extremely compact grouping of the elements of the invention and relationships between the same. As there illustrated, a base board member 35, having a central point 36, is equipped with a selector member or arrow 37 on one side and a disk identifier member 38 on the other. The problem board indicia is located on the face of the base board 35 where arrow 37 is affixed. Answer board indicia is on the face of base board 35 where the disk identifier member 38 is affixed. Thus the base board 35 functions on one side as the problem board member of the computation selector and on the other side as the answer board member of the answer verifier.

During play, participants become entitled to acquire alphabet letters corresponding to the letter codes for problems solved correctly by them. Thus, playing pieces, suitably of cardboard, each consisting essentially of a base member 39 (see FIG. 5) carrying an alphabet letter on the same, are desirably included as part of the apparatus. Each piece 39 may also include a numerical notation of letter value. For example, all pieces carrying a vowel may carry a low letter value of 1, primarily because vowels are in most words and are easily used to form words. A letter value of 2 might be assigned to most consonants, with higher letter values assigned to such consonants as $j$, $k$ and $v$, which occur less frequently in words of popular usage. The highest letter values might be reserved for the consonants of limited usage such as $q$, $x$ and $z$. Any number of playing pieces may be included as part of the apparatus. Generally, each letter of the alphabet will be carried on no less than six or eight playing pieces.

A variety of further modifications or additional elements may be incorporated as part of the apparatus without departing from the essential features of the invention. It is emphasized that letter codes may comprise two or three or more letters instead of single letters. A participant giving a correct answer may be allowed to use each letter of a multiple letter code for the formation of words, or may be required to elect to receive only one of the letters of the multiple letter code. Subscripts or superscripts of numerical notation of letter value may be placed near the letters of the letter codes on the playing board, either on the problem board member or the answer board member, or both. Either or both of the inner and outer array of numbers on the problem board may include (or even consist of) two or three or higher digit numbers. Problems presented on the computation selector may involve square root, taking numbers to various powers or multiples, or other mathematical functions or combinations. Indexing movement between the answer verifier members may be linear, with the code letters and numerals also linear. These and other modifications are comprehended within the scope of the appended claims.

The following is offered to illustrate usage.

During play, a participant spins the arrow or selector member of the computation selector and then, after the arrow comes to rest, is confronted with the problem selected by the arrow. He orally recites the answer (or writes it on a paper or chalk board), and then looks at the letter code associated with the answer. The next step is for the participant (or a teacher or monitor or another participant) to move the disk identifier member of the answer verifier until the letter code for his answer appears in the code window of that disk identifier member. Then he (and others playing the game) glance at the answer window of the disk identifier member and verify whether the correct answer numerical value was orally given. If the answer given by the player is verified to be correct, then that player is entitled to select a playing piece containing a letter of the letter code representative of the answer as correctly stated. But if the answer in the answer window is different from that stated by the participant, he is not entitled to select a playing piece containing a letter of the letter code representative of the correct answer. Other participants repeat this procedure.

As playing pieces containing alphabet letters are accumulated during play, participants form words using the playing pieces acquired by them. Varied rules of play and varied rules for determining who has performed in the best manner may be adopted.

The object of the game is not only to give participants practice in basic computation, but also to expose them to alphabet letters. Letters or combinations of letters may be arranged randomly (on the computation selector) and in ordered fashion (on the product verifier). Even further, the apparatus is useful for practice of the formation of words using alphabet letters earned during the computational exercise. To emphasize word formation, rules might be adopted whereby the first player to form a three letter word is declared a winner. Words having a greater number of letters might be required before a winner is declared. The building of words might be accomplished in a crossword puzzle fashion, either with individual players independently forming their own crossword puzzle arrangement, or with all players working on the same crossword puzzle arrangement and computing their score by adding letter values on the playing pieces (or on the playing board). Indeed, the playing pieces may be employed in a manner analogous to that for the popular game called by the trademark "Scrabble", if desired.

Further, a single player may use the apparatus in solitaire fashion to practice computation and build words. Large groups may use the apparatus with one person performing the mechanical functions and calling out the selected computational problem. The first player to call out an answer might be considered the sole player either entitled to a playing piece containing a letter of the letter code for the correct answer value or not, depending on whether his answer was correct or not. Alternatively, all persons in the group might write their answer on a piece of paper. Those giving the correct answer as verified by the person operating the game apparatus may then be entitled to a playing piece carrying a pertinent alphabet letter for the answer.

An essential feature of the apparatus is that it promotes not only practice in basic computation but also practice in the usage of alphabet letters. Thus manipulation of two different groups of vital symbols for a child's education and ultimate advancement is promoted by using the apparatus. Most importantly, this is accomplished in an active play environment which youngsters enjoy.

That which is claimed is:

1. Apparatus for improving the skills of mathematical computation and alphabet usage, comprising a computation selector in combination with an answer verifier,
   i. said computation selector consisting essentially of a problem board member and a selector member, said problem board member having a central point, means uniting said computation selector members together for relative rotary movement of one with respect to the other about said central point of said problem board member, said problem board member carrying on it visible indicia arranged in circumscribing fashion about said central point, said indicia including an inner array of primary numbers and an outer array of secondary numbers, said inner array comprising at least two said primary numbers, each said primary number being separated from adjacent ones thereof by a primary radial line separator, whereby each said primary number lies within a radial primary segment about said central point, said outer array of secondary numbers being radially outward from said primary numbers and being arranged with at least three said secondary numbers within the arc ambit of each said radial primary segment, each said secondary number lying within a radial secondary segment defined by secondary radial line separators between said secondary numbers, substantially all of said secondary numbers having associated therewith a visible letter code, each said letter code being representative of the numerical value of the correct answer for a predetermined mathematical computation between the said secondary number with which said letter code is associated and the primary number within the arc ambit of whose radial primary segment the said secondary number is located, different said correct answer numerical values being represented by a different said letter code,
   ii. said answer verifier comprising an answer board member and a visibly distinct identifier member, means uniting said answer verifier members together for relative indexing movement of one with respect to the other, said answer board member carrying on it indicia comprising each said letter code appearing on said computation selector, each said letter code on said answer board member having in uniform association with it the numerical value of said correct answer for the aforesaid predetermined mathematical computation, the said correct answer numerical value associated with each letter code on said answer board being visually apparent and identified by said identifier member when said identifier member is indexed to visually mark said letter code with which said correct answer numerical value is associated.

2. The apparatus of claim 1 wherein said answer board member has a central point, wherein said letter codes on said answer board member are arranged in a circumscribing array about said central point, and wherein said indexing movement is rotary about said central point.

3. The apparatus of claim 1 wherein said computation selector and said answer verifier are united together as a single piece of equipment, with said problem board member and said answer board member oriented laterally adjacent to each other for a playing surface on one side of said equipment.

4. The apparatus of claim 1 wherein said computation selector and said answer verifier are united together as a single piece of equipment, with said problem board member and said answer board member oriented back-to-back on opposite sides of said piece of equipment.

5. The apparatus of claim 4 where in said indicia carried on said problem board member and said indicia carried on said answer board member are on opposite sides of a single base member, whereby the board portion of said problem board member and said answer board member is one and the same.

6. The apparatus of claim 1 wherein said primary numbers are multipliers, said secondary numbers are multiplicands, said predetermined mathematical computation is multiplication, and each said correct answer numerical value is that for multiplication between said primary and secondary numbers.

7. The apparatus of claim 1 wherein said primary numbers are divisors, said secondary numbers are dividends, said perdetermined mathematical computation is division, and each said correct answer numerical value is that for division between said primary and secondary numbers.

8. The apparatus of claim 1 wherein said predetermined mathematical computation is addition, and wherein each said correct answer numerical value is that for addition between said primary and secondary numbers.

9. The apparatus of claim 1 wherein said predetermined mathematical computation is subtraction, and wherein each said correct answer numerical value is that for subtraction of a number in one said array of numbers from a number in the other said array of numbers.

10. The apparatus of claim 1 wherein substantially all said letter codes on said problem board member are single letters selected from the alphabet and randomly arranged on said problem board member, and wherein said letter codes of single letters on said answer board member are arranged thereon in the sequence in which they appear in the alphabet.

11. The apparatus of claim 1 wherein said correct answer numerical values which are equal in value are represented by the same letter code on said problem board member, said letter code comprising a vowel letter whenever three or more combinations of said primary numbers and secondary numbers give said equal correct answer numerical values.

12. The apparatus of claim 1 wherein at least one said letter code comprises at least two letters selected from the alphabet.

13. The apparatus of claim 1 additionally comprising a numerical notation for each said letter code.

14. The apparatus of claim 1 additionally comprising discrete playing pieces, each said playing piece having a single letter of the alphabet thereon, said playing pieces being adapted for use in forming words.

15. The apparatus of claim 14 wherein each said playing piece carries thereon a numerical notation of letter value.

* * * * *